United States Patent

[11] 3,617,103

[72] Inventor Yoshitaka Nakanishi
12-9, 5-chome, Yawate, Ichikawa-shi, Chiba-ken, Japan
[21] Appl. No. 883,380
[22] Filed Dec. 9, 1969
[45] Patented Nov. 2, 1971
[32] Priorities Dec. 11, 1968
[33] Japan
[31] 43/90229;
Sept. 27, 1969, Japan, No. 44/76698

[54] ROLLER
11 Claims, 10 Drawing Figs.
[52] U.S. Cl. .................................................. 308/208
[51] Int. Cl. ................................................. F16c 19/26
[50] Field of Search ..................................... 308/208, 214, 18, 16; 16/97, 106, 107

[56] References Cited
UNITED STATES PATENTS
263,097    8/1882    Barnes........................... 308/210
627,551    6/1899    Vidlund.......................... 308/208
2,505,592  4/1950    Stone ............................ 308/6
FOREIGN PATENTS
757,582    9/1956    Great Britain................ 308/237 A Primary Examiner—Martin P. Schwadron
Assistant Examiner—Frank Susko
Attorney—Robert E. Burns ABSTRACT: A roller has a circular disk body having means defining a center aperture disposed in the center thereof and means defining a plurality of retaining groove opening into the circumference of the center aperture and extending parallel to the axis of said center aperture to define bearing roller races, each the retaining groove having a nearly major arc in section effective to retain bearing rollers in the retaining grooves; a plurality of bearing rollers disposed in said retaining grooves; and a shaft inserted through the center aperture in contact with the bearing rollers.

PATENTED NOV 2 1971 3,617,103
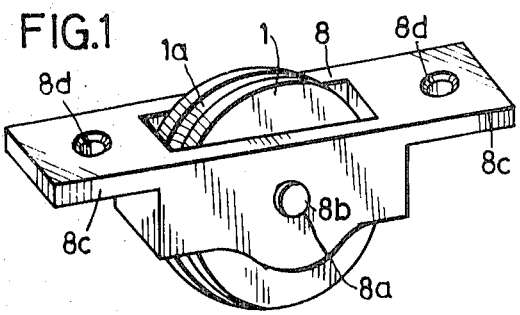
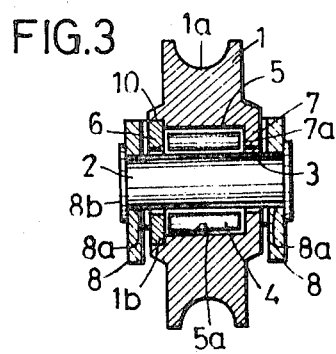
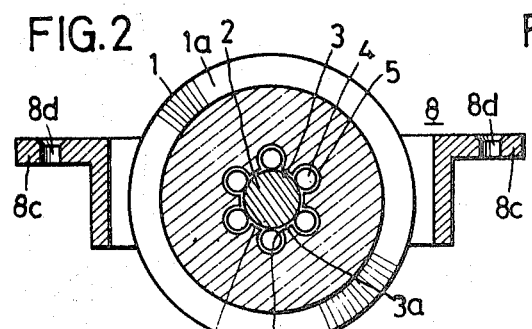
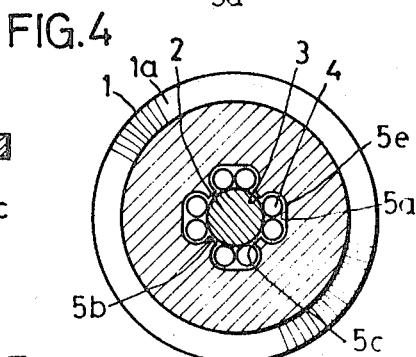
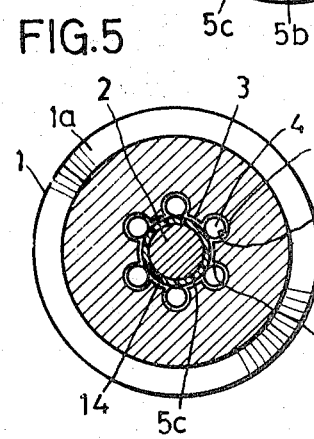
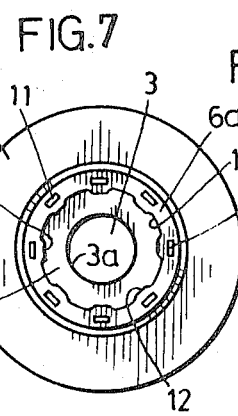
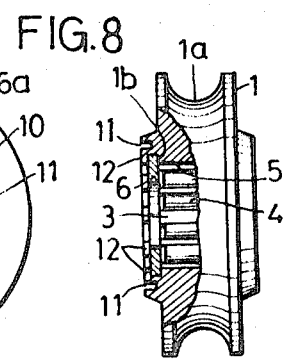
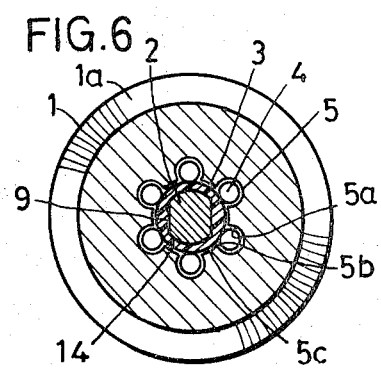
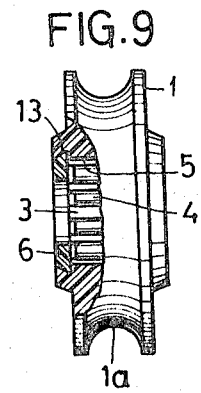
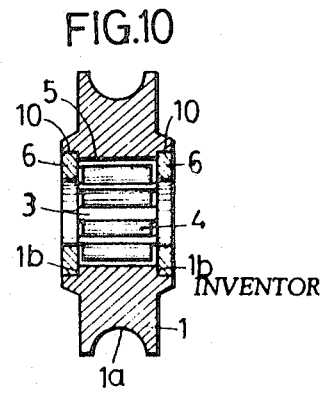
INVENTOR
BY
ATTORNEY

ROLLER

This invention relates in general to a roller and more particularly to a new and improved roller for use with a variety of sliding doors and furnishings which is simple in construction and low in cost.

Rollers employing such rolling elements as bearing rollers and needle rollers are known to those skilled in the art. In such prior rollers, it is usual that the rolling elements be disposed between a center aperture of a wheel and a shaft.

The construction of such conventional rollers makes it difficult to arrange the rolling elements so as to provide a sufficiently small clearance for successful operation of the roller because of the work error in the diameter of the center aperture and that of the rolling elements. It often happens that, even when the required number of rolling elements, for example, bearing rollers, have all been installed, a spacing shorter than the diameter of the bearing roller remains between mutually adjoining bearing rollers. The adjacent bearing rollers thus spaced lose parallelism, or incline, with respect to the axial direction of the shaft. Then the other bearing rollers are induced to incline in succession. The resultant abnormal conditions may make the rotation of the roller impossible, or not smooth at least.

Another prior type of roller proposed so far incorporates a rolling bearing comprising an inner ring, an outer ring, rolling elements and a retainer.

This modification, though almost free from the above described inclining phenomenon, is beset with complicated construction, intricate assembly and other production problems, requires for no little material supply and high precision, and other adverse problems, thus increasing production costs.

An object of this invention is to provide a novel roller capable of easy and smooth rotation for easy movement of moving bodies such as sliding doors.

Another object of this invention is to provide a roller capable of being manufactured by a simple and easy process and at a low cost.

Another object of the present invention is to provide a sturdy and durable roller construction.

In order to attain these objects, the present invention contemplates a roller comprising a circular solid disk body and having means defining a center aperture disposed in the center thereof and means defining a plurality of retaining groove openings into circumference of said center aperture, circumferentially spaced and aligned to define bearing roller races, each said retaining groove having a circular arc in section; bearing rollers retained within said retaining grooves and each minor arc portion of said bearing rollers being disposed in said center aperture; and a shaft inserted through said center aperture in contact with said bearing rollers.

Other objects, advantages and structural features of this invention will become more fully apparent from the following detailed description taken in conjunction with the accompanying drawing, in which:

FIG. 1 is a perspective view showing a roller embodying the present invention;

FIG. 2 is a front view in vertical section of the roller;

FIG. 3 is a side view in vertical section of the roller;

FIG. 4 is a front view in vertical section of a part of another roller assembly embodying this invention, showing how the embodiment has the bearing rollers and the shaft;

FIG. 5 is a view similar to FIG. 4 but showing a bushing interposed between the shaft and the bearing rollers;

FIG. 6 is a view similar to FIG. 5 but showing a different shaft section;

FIG. 7 is a front view of a wheel showing means for fixing a locking ring;

FIG. 8 is a side view of the wheel shown in FIG. 7, partly broken away;

FIG. 9 shows a modification of the embodiment illustrated in FIG. 8; and

FIG. 10 shows another modification of the embodiment illustrated in FIG. 8.

Referring now to the drawing and particularly to FIGS. 1 to 3, the reference numeral 1 shows the body of a wheel. The wheel body 1 is circular and solid. The periphery of the circular body has a circular groove 1a deepening or reducing in diameter gradually from its outer edge to its central circle so as to revolve on a rail (not shown). For some mating articles, said periphery may be flat without a circular groove. The body 1 has a center aperture 3 having a circular section.

A shaft 2 is inserted through the center aperture 3. The diameter of the center aperture is slightly larger than that of the shaft 2. Therefore, when the shaft 2 is passed through the center aperture 3, there exists a clearance 3a between the shaft and the wall surface of the center aperture. Part of the clearance 3a is occupied by part of bearing rollers 4.

The bearing rollers 4 are rotatably arranged in alignment along the circumference of the center aperture 3. The bearing rollers 4 are held by a plurality of retaining grooves 5 provided around the center aperture 3. The retaining grooves 5 are mutually spaced and aligned along the circumference of said center aperture and extend parallel to the axis of the center aperture. The retaining grooves 5 have wall surfaces 5a in the sectional form of a major arc and minor-arc openings 5b in continuity with the center aperture 3. The openings 5b allow adequate minor-arc surface portions of the bearing rollers 4 to project into the center aperture 3, more specifically into the clearance 3a. The bearing rollers 4 are retained by the major-arc wall surfaces 5a without falling into the center aperture. The bearing rollers include substantially all such rolling elements as needle rollers and cylindrical rollers.

The retaining grooves 5 are arranged at intervals 5c around the center aperture 3 and loaded with all necessary bearing rollers 4.

Both ends of the retaining grooves are closed by the radial shoulder 7a of a flange 7 integral with the body 1 and by the inside surface of a locking ring 6 made separately from said body. Therefore, the bearing rollers can not move in the axial direction either.

The shaft 2 is passed through the center aperture inside the annularly disposed bearing rollers 4. Both ends of the shaft are supported by support holes 8a made in a frame 8 and fixed by the riveted end 8b. The frame 8 has flanges 8c which have holes 8d for fitting the present roller assembly to a sliding door or the like.

Suitable materials for making the wheel body 1 and the bearing rollers 4 are various metal materials and plastic materials equivalent thereto. More particularly, the metal materials comprises aluminum alloys, zinc alloys, lead alloys, iron materials, sintered alloy, and so on, while the plastic materials are reinforced polyester resin, polyamide resin, polycarbonate resin, polyacetal resin, fluorine-contained resin, and so forth. When the wheel body and the bearing rollers are made of metal, such methods as casting, diecasting, sintering and drawing may be optionally employed. Meanwhile, when plastic materials are used, extrusion molding, injection molding, compression molding, etc. can be employed.

All these components are formed by a single process so that the center aperture and the retaining grooves are formed integrally at the same time as the forming of the wheel body. Thus, the structure is suitable for efficient mass production.

In the illustrative embodiments of the present invention, the bearing rollers are aligned but retained separately from one another in the mutually spaced retaining grooves so as to be supported directly by the wheel body. As a result, no such outer rings or retainers as required in some prior roller assemblies are necessary. Hence, the construction is simple as a whole. Furthermore, in spite of the elimination of such elements as mentioned above, the bearing rollers are retained so as not to shift in the radial direction. Thus, the components can be assembled securely and rapidly. Besides, even when manufacture errors occur in the retaining grooves and the bearing rollers, no failure will take place owing to cumulative errors, since the bearing rollers are not disposed continuously but arranged separately. Of course, the bearing rollers are free from a tendency to sag.

The body of the wheel embodying the present invention is solid so that a uniform weight distribution can be obtained.

When fitted to a door, for example, the roller thus formed, with the shaft supported by the door through the frame and the bearing rollers surrounding the shaft and rotatable around the shaft in contact with the circumferential surface, rotates so smoothly that the door can be moved lightly by the application of a small force.

Two or three bearing rollers may be placed in each retaining groove, is desired, as illustrated in FIG. 4, in which the retaining grooves 5e are so formed as to be slightly larger than the space occupied by two bearing rollers 4 disposed side by side. The length of the opening 5b in continuous relationship with the center aperture is made shorter than twice the bearing roller diameter so as to prevent the bearing rollers from falling off.

In the present invention, the interposition of a bushing between the shaft and the bearing rollers as shown in FIG. 5 is also effective for more smooth rotation of the bearing rollers around the shaft. The bushing 14 is fitted on the shaft 2 and in contact with the bearing rollers. The bushing 14 may be made of any of such self-lubricating plastic materials as polyamide resin, for example, nylon, fluorine-contained resin, for example, Teflon (trademark), and polyacetal resin, for example, Derlin (trademark). In the illustrated embodiment of this invention, the body of the roller and the shaft are made of a metallic material, while the bushing is formed of nylon.

The engagement of the bushing to the shaft can be strengthened in the following manner:

Referring to FIG. 6, the shaft and the bushing are partly in flat surface contact as represented by the numeral 9, and may have one or more noncircular sections. It has been ascertained by the present inventor that such a shaft and bushing assembly can be produced easily by transforming the inside of the bushing in accordance with the shaft having a modified sectional form.

A few methods for fixing the locking ring 6 to the wheel will be disclosed hereinafter.

Reference is now made to FIGS. 3, 7 and 8.

The wheel body 1 has an aperture 10 continuous and concentric with the center aperture 3 and having a larger diameter than said center aperture and has a cylindrical shoulder 1b bordering the aperture 10 and the center aperture 3.

The locking ring 6 is fitted into the aperture 10 so as to come in contact with the shoulder 1b.

In FIG. 3, the locking ring 6 is close fitted so tightly as to be firmly fastened to the wheel body without the aid of another means.

FIG. 7 and 8 illustrate an additional means for fixing the locking ring. In the illustration, the numeral 11 stands for a plurality of depressions provided on the surface of the body 1 on a circumferential line around the center aperture 10. The depressions 11 are made by means of a punch (not shown) having at one end a number of edges to be forced into the body 1. In accordance with the formation of the depressions, the body 1 has a number of projections 12 extending to the radial direction from the circumference of the aperture of the body. The projections 12 thus provided at intervals are caulked on the circumferential portion of the surface 6a of the locking ring 6, thereby fixing the locking ring 6 securely to the body 1.

In the modification illustrated in FIG. 9, the body 1 and the locking ring 6 are made of a somewhat flexible plastic material chosen from such materials mentioned hereinbefore and engage with each other by dovetail joint 13. The flexible locking ring can be removed.

FIG. 10 shows another modification in which the body 1 has such an aperture 10 and a cylindrical shoulder as described above on either side, each aperture 10 fitted tightly with a locking ring 6. It is of course easy to apply any of the aforesaid locking ring fixing means to this modified construction.

A bonding agent may be applied to the mating surfaces of the body 1 and the locking ring 6, if desired. According to this invention however, the locking ring can always be firmly fixed without the use of a bonding agent.

Although certain specific embodiments of the invention have to be shown and described, it will be obvious that various modifications thereof can be made to meet the uses and designs of sliding doors and similar articles without departing from the spirit and scope of the invention as defined in the appended claims.

What I claim is:

1. A roller comprising, a circular solid body having a central opening therein and a plurality of retaining grooves with a minor arc thereof opening into the circumference of said central opening said grooves extending parallel to the axis of said central opening thereby defining roller races; each of said grooves having a substantially major arc portion to retain bearing rollers therein; a plurality of bearing rollers within said grooves; a shaft in said opening defining a clearance between it and a wall surface defining said opening, and a part of said clearance being occupied by said rollers in direct contact with said shaft.

2. A roller according to claim 1, having a bushing comprising a flexible, self-lubricating, plastic material mounted circumferentially of said shaft in contact with said rollers.

3. A roller according to claim 1, including a frame mounting said shaft.

4. A roller assembly according to claim 3, wherein said frame has axial openings therein for journaling said shaft therein and additional openings for securing to a structure.

5. A roller according to claim 2, wherein said shaft is noncircular and said bushing has a circular outer peripheral surface in contact with said rollers.

6. A roller according to claim 1, wherein said body has a recess on at least one side thereof concentric with said central opening and communicating with said opening and with said retaining grooves; and a locking ring for closing one end of said grooves.

7. A roller according to claim 6, wherein said ring is force fitted in said recess.

8. A roller according to claim 6, wherein said recess has a circular shoulder having a larger diameter than said opening and said locking ring is in abutting contact with said shoulder.

9. A roller according to claim 6, wherein said locking ring and said body are of flexible plastic, said body having a dovetail-shaped groove along the circumference of said opening and said ring is dovetailed to fit in said groove.

10. A roller according to claim 6, wherein said body has a plurality of radial projections extending from the circumference of said opening, said locking ring being secured on said projections.

11. A roller according to claim 1, wherein each of said retaining grooves contains more than one bearing.

* * * * *